P. H. KELLS.
Mower.
No. { 118, / 1,222. }
Reissued Aug. 13, 1861.
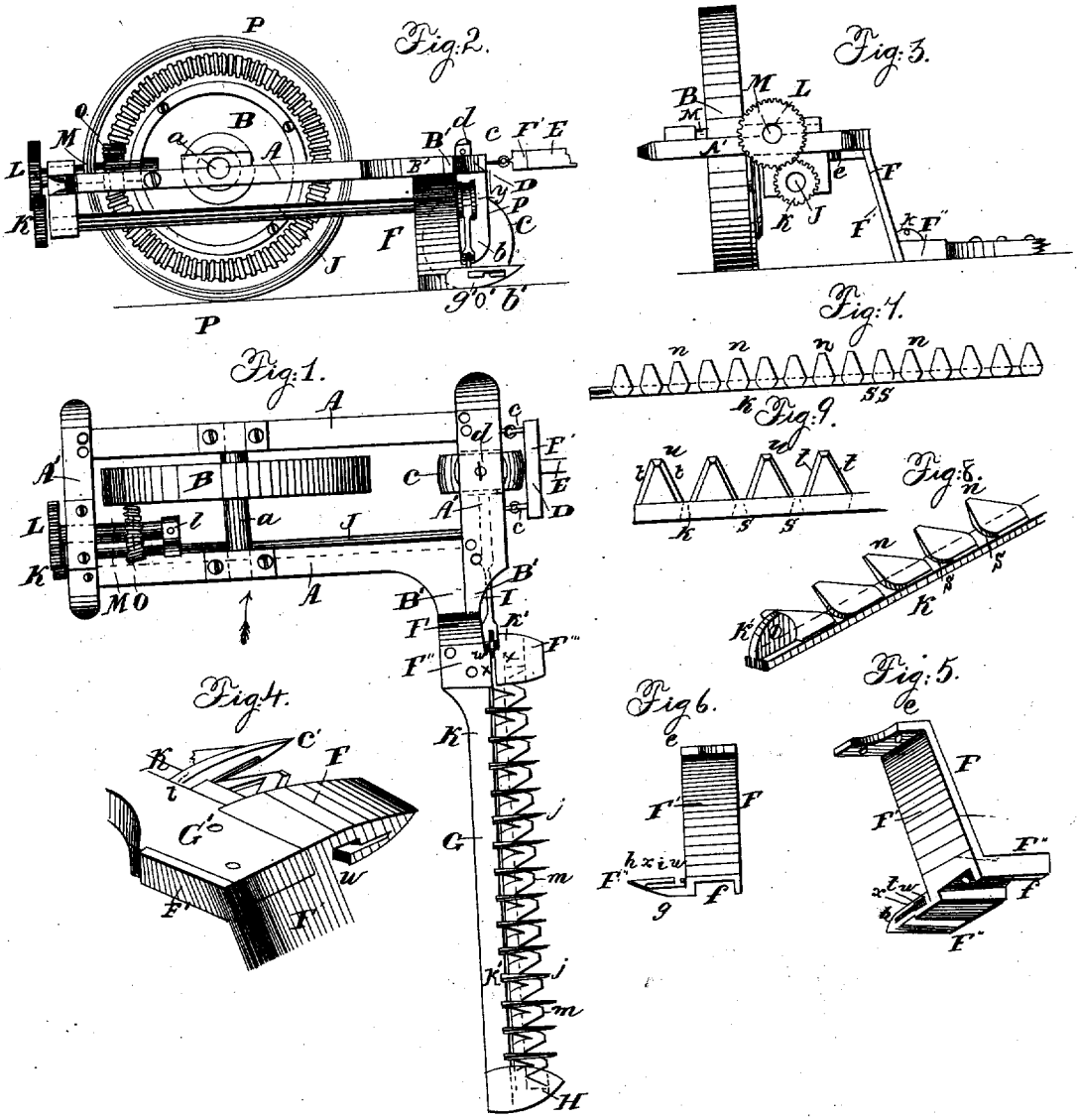
Witnesses
Wm. Yorke Clark & Co
Philadelphia Pa
H. A. Dodge
Assee of
Philip H. Kells
N. PETERS, PHOTO-LITHOGRAPHER, WASHINGTON, D. C.

UNITED STATES PATENT OFFICE.

THOMAS H. DODGE, OF WASHINGTON, DISTRICT OF COLUMBIA, ASSIGNEE OF PHILIP H. KELLS, OF ADRIAN, MICHIGAN.

IMPROVEMENT IN HARVESTERS.

Specification forming part of Letters Patent No. 10,671, dated March 21, 1854; Reissue No. 1,222, dated August 13, 1861.

DIVISION No. 3.

*To all whom it may concern:*

Be it known that PHILIP H. KELLS, formerly of Hudson, in the county of Columbia, State of New York, but now residing in Adrian, Lenawee county, State of Michigan, have invented certain new and useful Improvements in Harvesters or Mowing-Machines, of which the following is a full, clear, and exact description, reference being had to the annexed drawings, forming a part of this specification, and in which—

Figure 1 is a plan view of a machine showing one mode of applying the improvements which form the subject of this patent. Fig. 2 represents a side view of the machine, looking in the direction of arrow 1, Fig. 1. Fig. 3 represents a rear view of a part of the machine, showing the large cog-gear and the small pinion-wheel, main wheel, main frame, coupling or shoe piece, and a portion of the finger-beam. Fig. 4 represents a bottom view in perspective of a part of the coupling or shoe piece and the heel end of the finger-beam. Fig. 5 is a view in perspective of the coupling or shoe piece detached. Fig. 6 is a side view of the same. Fig. 7 represents a plan view of the cutter-bar with Kells's improved cutter attached thereto. Fig. 8 represents a view in perspective of a part of said cutter-bar and cutters; and Fig. 9 is a bottom view of four cutters attached to their bar, showing the position of the bevel as respects the cutter and cutter-bar.

That side of the machine next to the standing grass, and on which the finger-beam is arranged, I call the "inside," and that next to the cut grass I call the "outside."

In the accompanying drawings, A A A′ A′ represent the main frame composed of longitudinal and cross pieces properly fastened together. This frame is sustained in the main by a large wheel or rolling support, B, whose axle *a* is supported and turns in boxes or bearings fastened to the sides of the main frame. The front of the frame is provided with a swivel-wheel, C, whose journal *b* turns in ears which project down from the frame D, whose upper end is swiveled to the front of the frame, as seen at *d*, so that while the main frame is drawn along by the team attached to the tongue E, which projects forward from a cross-piece, E′, hinged to the front of the frame in any suitable manner, (in this instance by dead-eyes,) as seen at *c*, wheel C is free to turn in frame D, while in turning the machine, or, in case the front of the wheel C should happen to strike an angular stone or stump, such front can turn laterally to pass the same. In this case the wheel-frame D and end *d*, swiveled in the front of the main frame, all turn together. To the inner front corner of the frame, which is formed by the projecting ends B′ B′ of the pieces A′ A′, is fastened a coupling or shoe piece, F. This coupling or shoe piece is provided in this instance with a knee or projection, *e*, at its top or elevated end, by which it is bolted fast to the under side of the projecting part B′ B′ of the main frame, while the coupling or extension part F′ extends down and out toward the standing grass and terminates in a shoe part, F″, having a recess, *f*, in which to fasten the heel end of the finger-beam, a groove, *g*, for the heel end of the cutter-bar to work in, together with a long, narrow slit, *h*, for the cutters to pass through, and an opening, *i*, for the projection *k′* on the heel of the cutter-bar *k* to work through when the machine is in operation. The front F″ projects forward and up like a shoe or runner, as fully shown in the drawings. The heel G′ of the finger-beam G is provided with shoulders, whereby, when placed in the recess *f* of the shoe and one or two bolts passed through both, it is held in a firm and substantial manner. (See Fig. 4.)

When the heel of the finger-beam is in place, the lower surfaces of the finger-beam and the part F″ are flush; consequently they both glide over the ground with ease, and without danger of catching cut stalks or striking against stones or other similar obstructions.

The outer end of the finger-beam is provided with a shoe, H, having an opening, *g′*, for the cutter-bar to work through, and a narrow slit, *h′*, for the outer cutter to work through.

It is now generally conceded that a shoe for supporting the heel of the cutter-bar and finger-beam is a very essential element in a mowing-machine, and the improvements which form the subject-matter of this patent relate to improvements connected therewith.

In the drawings, F represents the shoe for supporting and guiding the heel of the cutter-bar, and also for supporting the finger-beam at that point. If the finger-beam were to be fastened directly to one end of the main frame of a mowing-machine, that end of the frame would have to be depressed or inclined close down to the ground, in order to allow the cutter to run sufficiently close to the ground to do good work. This arrangement would, however, render the depressed end of the frame very liable to catch and drag along the grass cut by a previous swath, and also render the frame liable to strike against stones and like obstructions.

It is also necessary, in order to prevent binding of the cutter-bar and cutters, that the slot to guide the heel of the cutter-bar and that part of the finger-beam near the same should both retain a fixed relative position, since the cutter-bar and its cutter or cutters usually reciprocate through slots in guards or fingers which are fastened to the finger-beam, and this fixed relative position is attained by the use of a shoe in which a groove is formed on its under side to receive the finger-beam, while a top groove is formed on or in the top of the shoe to receive and guide the heel of the cutter-bar; consequently when the shoe is once fastened to the main frame the cutter-bar and finger-beam are retained in their proper and relative positions.

Another advantage due to fastening the finger-beam in a groove or recess in the bottom of the shoe is the fact that the bottom of the finger-beam is brought close down to the ground, and consequently enables the cutters to leave a very short stubble, and this is much facilitated by so fastening the fingers to the finger-beam as that no part of the guards or fingers will project back under the finger-beam or below its lower surface, thus allowing the bottom of the finger-beam to drag along directly on the stubble and ground.

By making the front of the shoe incline up like a runner and project forward in advance of the point where the shoe is connected to the main frame it surmounts and rides over cut grass and little elevations in the ground with great ease, while at the same time the attendant has free and unobstructed access over the elevated point of said shoe to the groove in which the heel of the cutter-bar works, to clear out the same in case the heel of the cutter and cutter-bar happen to get clogged up. As the cutter has to run at a very rapid rate, it is more convenient to get up the necessary speed from the main wheel or wheels, which are usually placed at or near the center of the machine, to have the finger-beam and cutter project laterally from one end of the machine.

In this machine the cutter-bar is operated by pitman I, eccentric shaft J, gears K, L, O, and P, the latter being fastened to the main wheel B.

It is evident that the improvements which form the subject-matter of this patent are applicable to other mowing-machines in use, and the skill of the constructer will be sufficient to make the modifications necessary to such application.

Other improvements shown in the machine are described in other patented divisions of even date herewith.

One practical mode of applying the improvements to use having been herein described, what is claimed under this patent as the invention of the said PHILIP H. KELLS is —

The arrangement of the projecting or runner part of the shoe with the upwardly-inclined connection and main frame, substantially as described, whereby free access may be had to the shoe in advance of the frame, and at the same time an open and unobstructed space is left between the heel of the finger-beam and the line of draft.

In witness whereof I have hereunto subscribed my name.

THOMAS H. DODGE,
*Assignee of Philip H. Kells.*

In presence of—
WM. YORKE ATLEE,
RANDOLPH COYLE, Jr.